(12) United States Patent
Råbe

(10) Patent No.: US 12,534,252 B2
(45) Date of Patent: Jan. 27, 2026

(54) TRANSVERSAL SEALING SYSTEM AND A METHOD FOR TRANSVERSALLY SEALING A TUBE OF PACKAGING MATERIAL

(71) Applicant: Tetra Laval Holdings & Finance S.A., Pully (CH)

(72) Inventor: Magnus Råbe, Lund (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 0 days.

(21) Appl. No.: 18/851,239

(22) PCT Filed: Apr. 11, 2023

(86) PCT No.: PCT/EP2023/059367
§ 371 (c)(1),
(2) Date: Sep. 26, 2024

(87) PCT Pub. No.: WO2023/198666
PCT Pub. Date: Oct. 19, 2023

(65) Prior Publication Data
US 2025/0197045 A1 Jun. 19, 2025

(30) Foreign Application Priority Data

Apr. 12, 2022 (EP) ..................................... 22167954

(51) Int. Cl.
*B65B 51/22* (2006.01)
*B65B 51/30* (2006.01)
(52) U.S. Cl.
CPC .......... *B65B 51/225* (2013.01); *B65B 51/303* (2013.01)
(58) Field of Classification Search
CPC . B29C 65/08; B29C 65/7451; B29C 65/7841; B29C 66/1122; B29C 66/324;
(Continued)

(56) References Cited

U.S. PATENT DOCUMENTS 4,534,818 A 8/1985 Kreager et al.
6,482,291 B1 * 11/2002 Kume ................. B29C 66/4322
156/580.2

(Continued)

FOREIGN PATENT DOCUMENTS

EP 1127794 A2 8/2001
EP 3581368 A1 12/2019

OTHER PUBLICATIONS

International Search Report mailed Jul. 24, 2023, for International Application No. PCT/EP2023/059367.

*Primary Examiner* — Himchan Song
(74) *Attorney, Agent, or Firm* — Renner, Otto, Boisselle & Sklar, LLP

(57) ABSTRACT

A transversal sealing system for a packaging machine is provided. The sealing system comprises an ultrasonic arrangement arranged to face an outside surface of a tube of packaging material from a first sealing direction, wherein the tube comprises a longitudinal sealing area in which at least two layers of packaging material are overlapping, an anvil arranged to face the outside surface from a second sealing direction, wherein the ultrasonic arrangement comprises a sonotrode arranged to apply ultrasonic vibrations such that an inner layer of the packaging material is at least partly melted, a first pressure plate arranged next to the sonotrode and upstream the feeding direction of the tube, wherein the first pressure plate is non-oscillating, a second pressure plate arranged next to the sonotrode and downstream the feeding direction of the tube, wherein the second pressure plate is non-oscillating, wherein the sonotrode is arranged to provide a TS-LS overlap pressure in a TS-LS overlap area, the first pressure plate is arranged to provide a first pressure in a first area, placed upstream the TS-LS overlap area in the feeding direction, and the second pressure plate is arranged (Continued)

to provide a second pressure in a second area, placed downstream the TS-LS overlap area in the feeding direction.

14 Claims, 6 Drawing Sheets

(58) Field of Classification Search
CPC .............. B29C 66/346; B29C 66/4312; B29C 66/4322; B29C 66/72328; B29C 66/81427; B29C 66/81431; B29C 66/81465; B29C 66/81815; B29C 66/83543; B29C 66/849; B29L 2031/7166; B65B 51/225; B65B 51/303
See application file for complete search history.

(56) References Cited

U.S. PATENT DOCUMENTS

| | | | |
|---|---|---|---|
| 7,178,316 B2* | 2/2007 | Kume | B29C 66/4322 156/580.2 |
| 2016/0001498 A1* | 1/2016 | Voegler | B29C 65/7451 53/551 |
| 2018/0222617 A1* | 8/2018 | Yamamoto | B29C 65/7451 |
| 2019/0202587 A1* | 7/2019 | Yuhara | B29C 65/7451 |
| 2020/0247066 A1* | 8/2020 | Yuhara | B29C 66/81433 |
| 2022/0002017 A1* | 1/2022 | Morikawa | B29C 66/81431 |

* cited by examiner

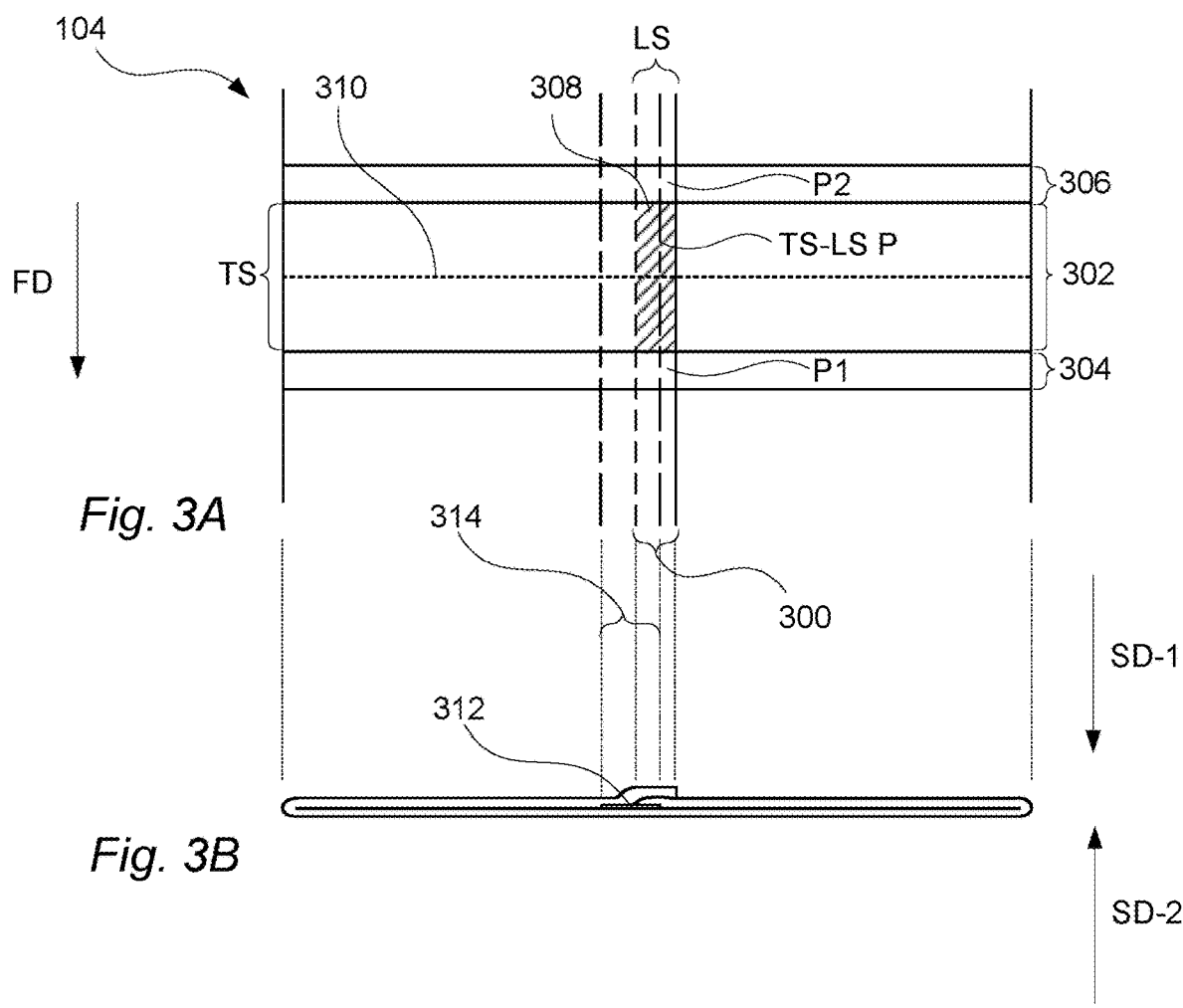

TRANSVERSAL SEALING SYSTEM AND A METHOD FOR TRANSVERSALLY SEALING A TUBE OF PACKAGING MATERIAL

TECHNICAL FIELD

The invention relates to packaging technology. More particularly, it is related to transversal sealing systems for packaging machines, such as roll-fed carton packaging machines, and also a method for transversally sealing a tube of packaging material.

BACKGROUND ART

Roll-fed carton filling machines, also referred to as packaging machines, are well known. The roll-fed filling machines are one out of two commonly known types of machines for producing carton packages. The other type of filling machines are so-called blanks-fed filling machines. Unlike, the roll-fed filling machines, in the blanks-fed filling machines, a longitudinal sealing is pre-made. In other words, before sending the packaging material to the blanks-fed filling machines, a web of packaging material is formed into a tube and the longitudinal sealing is provided as part of that process. In addition to having the longitudinal sealing pre-made, the cutting is also pre-made. As an effect of having the longitudinal sealing as well as the cutting made outside the filling machines, fewer steps need to be performed in in the blanks-fed filling machines. Once receiving the blanks, i.e. flat-folded pieces of the tube, the blanks are erected into sleeves. Thereafter, one end of the sleeves are closed, and food product is filled into the sleeves via open ends. Once filled, the sleeves are also closed in the other ends. Most often, once the sleeves are closed in both ends, these are folded into packages, e.g. gable top packages or rectangular cuboid packages.

In the roll-fed filling machines, the packaging material is provided on a reel. After unwinding the packaging material, the web of packaging material is treated to provide for that any bacteria, germs or other unwanted microorganisms are removed, e.g. by using a hydrogen peroxide bath. Once the web is sterilized, this is formed into the tube. By having the tube placed vertically, the food product can continuously be filled into the tube from above. The formation of the tube is achieved by that one of two outer longitudinal edges of the web is placed on top of the other longitudinal edge. Heat and pressure is provided such that plastic layers of the packaging material melt and thereby adhere the two edges together. To protect a carton layer of the packaging material, provided for achieving robustness as well as environmental benefits, a strip of plastic material may be attached to an inside of the tube such that the food product is hindered from coming in contact with the carton layer via the edge of the web placed inside the tube.

After having formed the web into the tube and after having filled food product into the tube, transversal sealings are provided in the low end of the tube. Most often two transversal sealings are made at the same time. By doing so, it is made possible to cut the tube at the same time. By cutting between the two transversal sealings, a most lower portion of the tube with transversal sealings in both ends can be detached and fed to a next step of the process.

The transversal sealing can be made in different ways. In case the packaging material is provided with an Aluminum foil layer, induction heating may be used for generating heat that in turn will provide for that the plastic layers melt. In case no Aluminum foil is provided, ultrasonic sealing can be used. In short, when using this technology, ultrasonic waves are generated by an ultrasonic device. These waves affect the plastic layers such that heat is generated, and as an effect thereof the plastic layers melt.

Irrespective which transversal sealing technology that is used, the transversal sealing step in the filling machines is a critical step. In case the longitudinal sealing is not adjusted properly with respect to the transversal sealing system, this may result in that a three-layer area, i.e. the area in which the longitudinal sealing and the transversal sealing meet, is not placed correctly, and as an effect of this that an insufficient transversal sealing is achieved.

Still a problem to take into account during the transversal sealing step is that the combination of heat and pressure may result in that melted plastics are moved from or moved within a transversal sealing area in a way such that insufficient sealings are provided. In other words, over-heating or over-pressing may result in unwanted effects. Finding a balance between heat and pressure in combination with that both two and three layers of packaging material need to be handled is a challenge. On top of this challenge, by taking into account that the transversal sealing often should be made in less than a second, in some situations less than 0.2 seconds, this is even more of a challenge.

As described above, roll-fed carton packaging machines have been used for decades and billions of packages are produced annually by such machines. One such example is Tetra Pak A3 marketed by Tetra Pak™.

Even though the filling machines of today are producing carton packages at impressive speed and are fulfilling high quality standards, there is still room to improve. By being able to control the process of transversal sealing even more in detail, packaging material with even less environmental impact can be used. In addition, when having better control of the transversal sealing process, it can be made possible to adapt the transversal sealing system to a specific packaging material in a way not possible with today's technology.

SUMMARY

It is an object of the invention to at least partly overcome one or more of the above-identified limitations of the prior art. In particular, it is an object to provide a transversal sealing system that is less dependent on tube rotation, that is, misplacement of the longitudinal sealing. Further, it is also an object to provide a system that is less dependent on a width of the longitudinal sealing. Still further, it is an object to provide for that a risk of heat leakage from a transversal sealing area to neighboring areas is reduced. It is also an object to reduce a risk for plastic lump formations creating insufficient transversal sealings. In addition, it is an object to reduce power consumption for the transversal sealing process. Further, it is an object to provide a transversal sealing system with high predictability in terms of how the packaging material will be affected, thereby allowing reliable virtual modelling. Still an objective is to provide a longer lifetime of the transversal sealing system as an effect of lower energy consumption (lower amplitude and lower power). It is also an object to provide longer cooling time and less usage of energy for cooling. Further, it is an object to be able to produce the transversal sealing system cost-efficiently.

Throughout this document the word "sonotrode" is given a broad meaning, more particularly it may be a horn connected to a transducer or a converter such that ultrasonic waves can be generated. The term "ultrasonic arrangement should also be interpreted broadly, and it should be understood to cover e.g. a transducer provided with a horn as well as a converter provided with a horn.

According to a first aspect it is provided a transversal sealing (TS) system for a packaging machine, said sealing system comprising an ultrasonic arrangement arranged to face an outside surface of a tube of packaging material from a first sealing direction (SD-1), wherein the first sealing direction (SD-1) is perpendicular to a feeding direction (FD) of the tube, wherein the tube comprises a longitudinal sealing (LS) area in which at least two layers of packaging material are overlapping, an anvil arranged to face the outside surface from a second sealing direction (SD-2), wherein the second sealing direction (SD-2) is opposite to the first sealing direction (SD-1), wherein the ultrasonic arrangement may comprise a sonotrode arranged to apply ultrasonic vibrations such that an inner layer of the packaging material is at least partly melted, a first pressure plate arranged next to the sonotrode and upstream the feeding direction (FD) of the tube, wherein the first pressure plate may be non-oscillating, a second pressure plate arranged next to the sonotrode and downstream the feeding direction (FD) of the tube, wherein the second pressure plate may be non-oscillating, wherein the sonotrode may be arranged to provide a TS-LS overlap pressure (TS-LS P) in a TS-LS overlap area, the first pressure plate may be arranged to provide a first pressure (P1) in a first area, placed upstream the TS-LS overlap area in the feeding direction, and the second pressure plate may be arranged to provide a second pressure (P2) in a second area, placed downstream the TS-LS overlap area in the feeding direction (FD).

An advantage of having the first and second pressure plates is that the transversal sealing process is less dependent on the tube rotation. By providing these static elements next to the active element, that is, the sonotrode, sufficient sealing can be provided for both two and three layers of packaging material.

By having a larger working area, i.e. covering both two and three layers sections, for the transversal sealing, compared to the ultrasonic-based transversal sealing systems used today that do not comprise the static elements, it is made possible to have a thinner polymer layer, i.e. the inner layer of the packaging material. Put differently, by having this larger working area, a risk of over-melting the inner layer is reduced, thereby in turn reducing the risk of producing packages not fulfilling quality standards. Since this risk can be reduced, it is made possible to reduce a thickness of the inner layer and still keep today's sealing quality. Having a thinner inner layer is beneficial both from cost perspective and sustainability perspective.

The transversal sealing system may be comprised in a roll-fed packaging machine as well as a blanks-fed packaging machine. As an effect, the wording "tube" should be interpreted broadly. In case the transversal sealing system is comprised in the roll-fed packaging machine, the tube may be continuously produced from a web of packaging material and sealed in a lower end. On the other hand, in case the transversal sealing system is comprised in the blanks-fed packaging machine, the tube may be a sleeve with a pre-made longitudinal sealing used for producing one package. Several flat-folded sleeves may be placed in a magazine from which these can be fed into the blanks-fed packaging machine. Tetra Pak® A3 Speed is an example of the roll-fed packaging machine and Tetra Pak® R2 Machine is an example of the blanks-fed packaging machine. A further example of a blanks-fed packaging machine is Tetra Pak® TT/3.

The TS-LS overlap pressure (TS-LS P) may be greater than the first pressure (P1) and/or the second pressure (P2).

The first pressure plate may be provided with a first slope sloping away from the sonotrode and/or the second pressure plate may be provided with a second slope sloping away from the sonotrode.

An advantage with having theses slopes is that a risk of formation of plastic lumps can be reduced.

The anvil may be provided with a first slope sloping away from the sonotrode and/or with a second slope sloping away from the sonotrode.

The first and second pressure plate may extend along a full width of the sonotrode.

The anvil may be provided with a TS-LS anvil profile in a TS-LS anvil section arranged to meet the TS-LS overlap area of the tube, and a TS anvil profile in a TS anvil section arranged to meet a TS area of the tube.

The sonotrode may be provided with a TS-LS sonotrode profile in a TS-LS sonotrode section arranged to meet the TS-LS overlap area of the tube, and a TS sonotrode profile in a TS sonotrode section arranged to meet a TS area of the tube.

The first and/or second pressure plate may be provided with at least one ridge for blocking plastic lumps formed at edges of the TS-LS overlap area and/or edges of an LS-strip area.

The first and/or second pressure plate may be spring loaded.

The transversal sealing system may further comprise a third pressure plate placed in a groove in the sonotrode.

The packaging material may comprise at least one cellulose-based layer, such as a carton layer, an inner polymer layer and is void of Aluminum.

Ultrasonic waves propagate to a larger extent in the packaging material comprising the cellulose-based layer compared to, for instance, a packaging material only comprising polymer-based layers. Thus, having the transversal sealing system as described above will be of particular benefit to the packaging material comprising the cellulose-based layer.

Induction heat sealing requires a layer for an inductor to interact with, such as the Aluminum layer often provided in packaging materials used for food products. The Aluminum layer however comes with environmental disadvantages. By using ultrasonic sealing technologies, as described above, the Aluminum layer is not needed for the transversal sealing. Thus, the transversal sealing system described above comes with the benefit that a more environmentally beneficial packaging material can be used in a more cost efficient and reliable manner.

According to a second aspect it is provided a packaging machine comprising a packaging material receiver, a food product filling pipe arranged to fill food product into the tube, and the transversal sealing (TS) system according to the first aspect.

A package material receiver can receive a reel of packaging material or it may be a magazine holding blanks.

According to a third aspect it is provided a method for transversally sealing a tube of packaging material, said method comprising providing the tube of packaging material in a feeding direction (FD), generating ultrasonic waves by using a sonotrode comprised in an ultrasonic arrangement such that an inner layer of the packaging material in a transversal sealing area at least partly melts, and pressing together the tube in the transversal sealing area by moving the transducer arrangement in a first sealing direction (SD-1) and moving an anvil in a second sealing direction (SD-2), wherein the second sealing direction (SD-2) is opposite to the first sealing direction (SD-1), wherein the ultrasonic arrangement may comprise the sonotrode, a first pressure plate arranged next to the sonotrode and upstream the feeding direction (FD) of the tube, wherein the first pressure plate may be non-oscillating, a second pressure plate arranged next to the sonotrode and downstream the feeding direction (FD) of the tube, wherein the second pressure plate may be non-oscillating, wherein the sonotrode may be arranged to provide a TS-LS overlap pressure in a TS-LS overlap area, the first pressure plate may be arranged to provide a first pressure in a first area, placed upstream the TS-LS overlap area in the feeding direction (FD), and the second pressure plate may be arranged to provide a second pressure in a second area (306), placed downstream the TS-LS overlap area in the feeding direction (FD).

The method may further comprise releasing stress from the first area by a first slope sloping away from the sonotrode, and/or releasing stress from the second area by a second slope sloping away from the sonotrode.

The method may further comprise blocking plastic lumps formed at edges of the TS-LS overlap area and/or edges of an LS-strip area by at least one ridge provided on the first and/or second pressure plate.

The same features and advantages as presented above with respect to the first aspect also apply to this third aspect.

Still other objectives, features, aspects and advantages of the invention will appear from the following detailed description as well as from the drawings.

BRIEF DESCRIPTION OF THE DRAWINGS

Embodiments of the invention will now be described, by way of example, with reference to the accompanying schematic drawings, in which

FIG. 3A illustrates a tube of packaging material from a side view.

FIG. 3B illustrates the tube from a top view.

DETAILED DESCRIPTION

Figure 1:
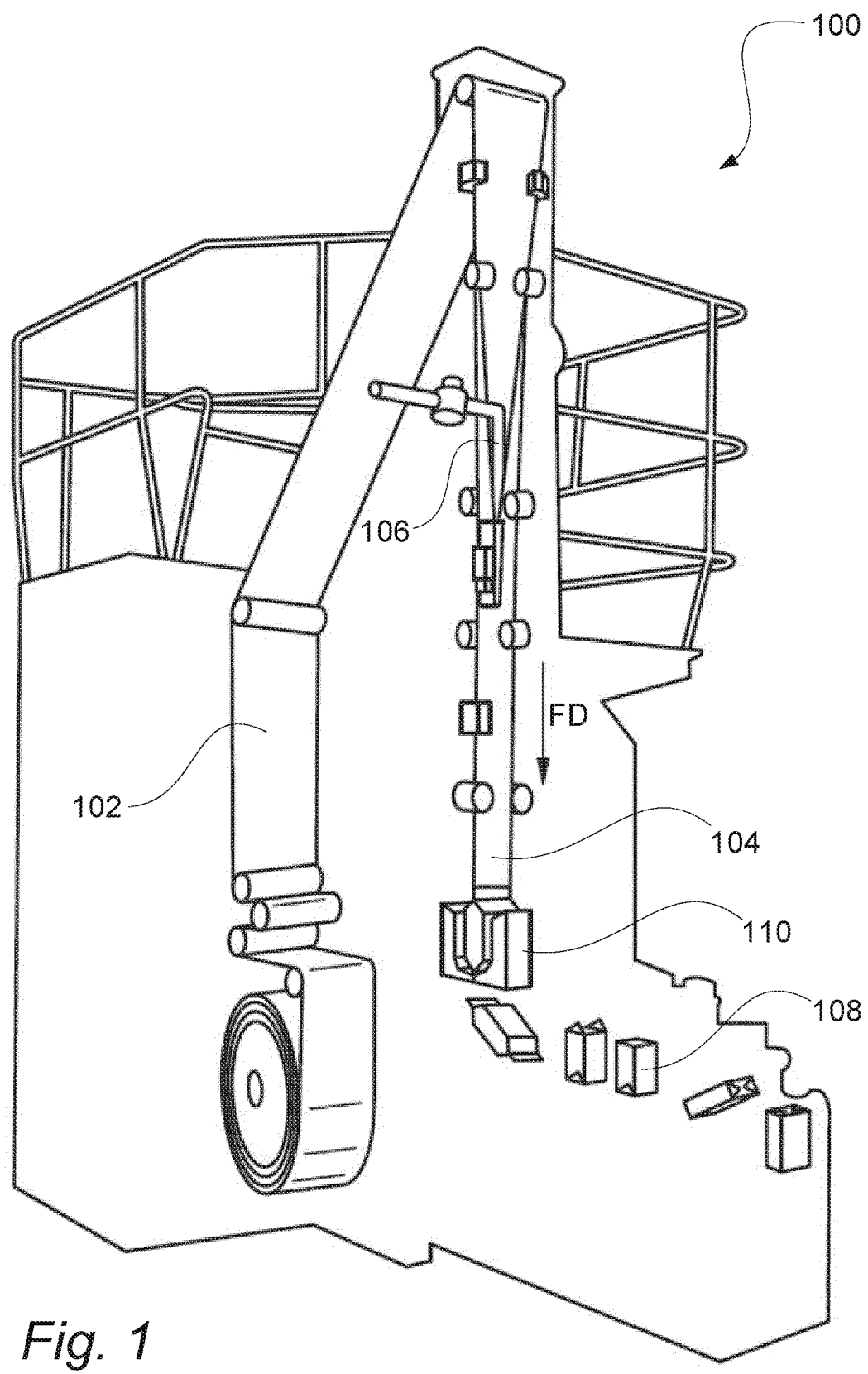
FIG. 1 is a general illustration of a roll-fed carton packaging machine.

FIG. 1 generally illustrates a packaging machine 100. In the illustrated example, the packaging machine 100 is a roll-fed carton packaging machine. The general principle of such a machine is that from a roll of packaging material a web 102 is formed. Although not illustrated, if needed in order to fulfil food safety regulations, the web 102 may be sterilized using a hydrogen peroxide bath, a Low Voltage Electron Beam (LVEB) device or any other apparatus capable of reducing a number of unwanted microorganisms. After sterilization, by using a longitudinal sealing device, the web 102 can be formed into a tube 104. When having formed the tube, a product, for instance milk, can be fed into the tube 104 via a product pipe 106 placed at least partly inside the tube 104.

In order to form a package 108 from the tube 104 filled with product, a transversal sealing can be made in a lower end of the tube by using a transversal sealing system 110. Generally, the system 110 has two main functions; 1) providing the transversal sealing, i.e. welding two opposite sides of the tube together such that the product in a lower part of the tube, placed downward the sealing system, is separated from the product in the tube placed upward the sealing system, and 2) cutting off the lower part of the tube such that the package 108 is formed. Alternatively, instead of providing the transversal sealing and cutting off the lower part in one and the same system 110 as illustrated, the step of cutting off the lower part may be made in a subsequent step by a different piece of equipment, or by the consumer if the packages are intended to be sold in a multi-pack.

Figure 2:
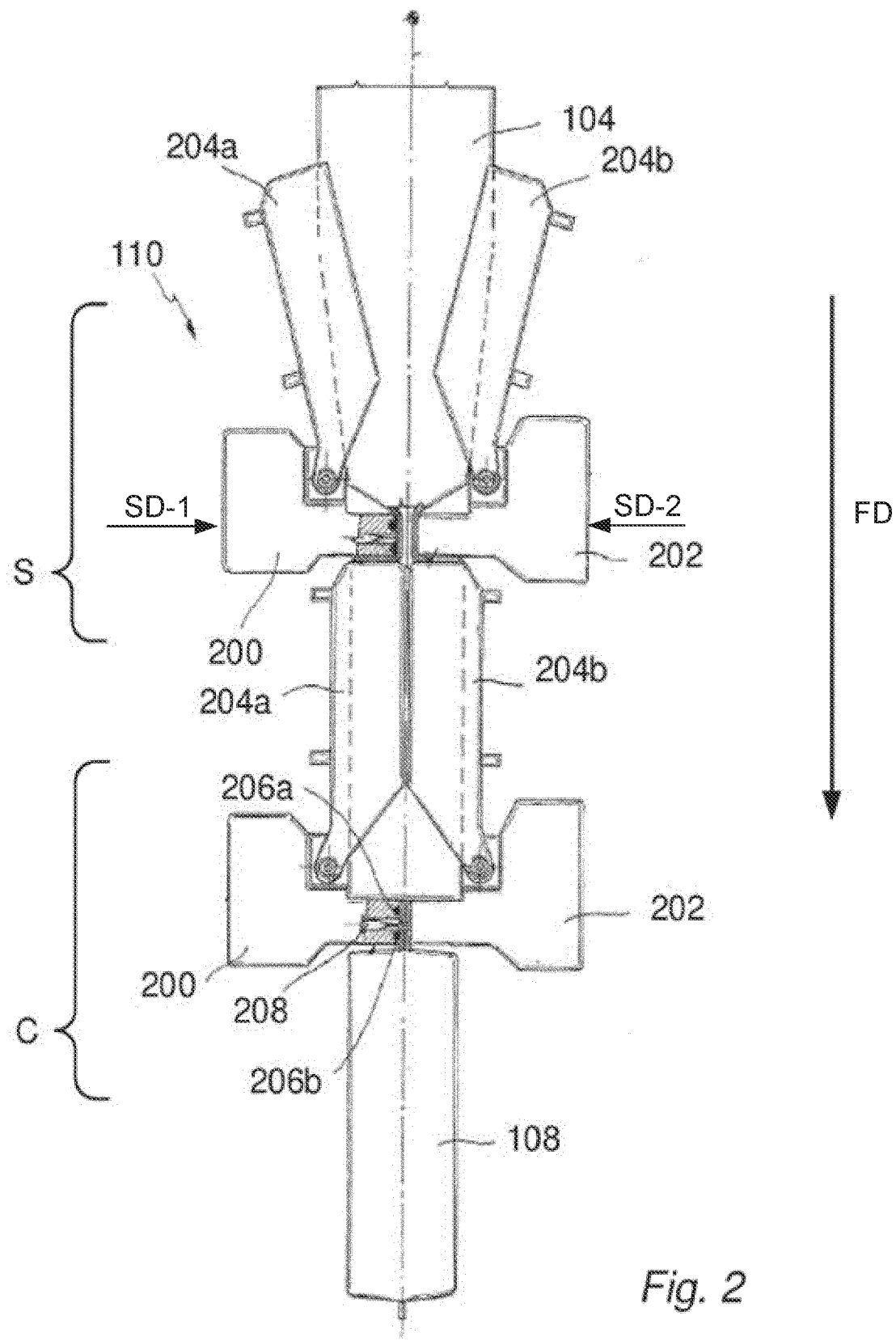
FIG. 2 is a cross-sectional view of a transversal sealing process.

In FIG. 2 a general principle of the transversal sealing system 110 is illustrated in further detail by way of example. The tube 104 can be fed from above since this provides for that product can be held inside the tube as illustrated in FIG. 1. In a first stage, a sealing stage S, a first jaw provided with a sealing device 200 and a second jaw provided with a counter pressure device 202 are moved towards each other, the sealing device in a first sealing direction SD-1 and the counter pressure device 202 in a second sealing direction SD-2, such that two opposite sides of the tube 104 are pressed towards one another. In order to provide for the transversal sealing, heat can be provided by inducing eddy currents in the packaging material while pressing the two opposite sides together. Heat may also be provided by that ultrasonic waves are emitted from the sealing device 200. The heat provides for that a polymer layer, also herein referred to as plastic layer, of the packaging material is melted, which in turn provides for the polymer layer can be used for making sure that the two opposite sides can attach to each other and stay together after the jaws are removed. In a subsequent step, herein referred to as a cutting stage C, the lower part of the tube 104 can be cut off such that the package 108 is formed. In order to increase a speed in which packages are formed, the jaws can be moved together with the tube 104 in a tube feeding direction FD during the sealing stage S and the cutting stage C.

In order to provide for a more controlled forming process of the package 108 so-called volume forming flaps 204a, 204b can be used. More specifically, by using these the tube 104 having a round cross-section may be steered into a package 108 having a rectangular cross-section in a controlled manner.

The sealing device can be provided with two inductors, a first inductor 206a and a second inductor 206b. In the illustrated example, the first inductor 206a is arranged above the second inductor 206b. After having provided the transversal sealing a knife 208 can be used for cutting off the lower part of the tube and thus form the package 30 108. In this example, the knife 208 and the first and second inductors 206a, 206b are provided in the sealing device, but other arrangements are also possible. For instance, the knife may be provided on the other side of the tube, in the counter pressure device, or the cutting step may be performed by a separate device downstream the sealing device. Alternatively, if using ultrasonic sealing technology instead of induction heating technology, the sealing device 200 may comprise a transducer made to generate the ultrasonic waves.

FIG. 3A generally illustrates a side view of the tube 104 after a longitudinal sealing LS and a transversal sealing TS have been made. FIG. 3B also illustrates the tube 104, the LS and the TS, but from a top view.

As illustrated, the LS can be provided in an LS area 300 provided along the tube 104. The TS can be provided in a TS area 302 extending perpendicular to the LS area 300. Upstream the TS area 302 with respect to the feeding direction FD, a first area 304 can be provided, and downstream, also with respect to the feeding direction FD, a second area 306 can be provided. By having the first and second areas 304, 306, transition areas between the TS and a mid-portion of the package 108, in which the food product is held, can be provided. A TS-LS overlap area 308 represents an interface of the TS area 302 and the LS area 300, i.e. in the TS-LS overlap area 308 the TS area 302 and the LS area 300 meet. As an effect, in this TS-LS area three layers of packaging material are provided. As described above, after the TS is made the knife 208 may cut the tube 104 apart. In FIG. 3A, this is illustrated by a cutting line 310. Also described above, to protect the carton layer, or any other cellulose-based layer, in the packaging material an LS strip 312 may be provided in an LS strip area 314.

Figure 4A:
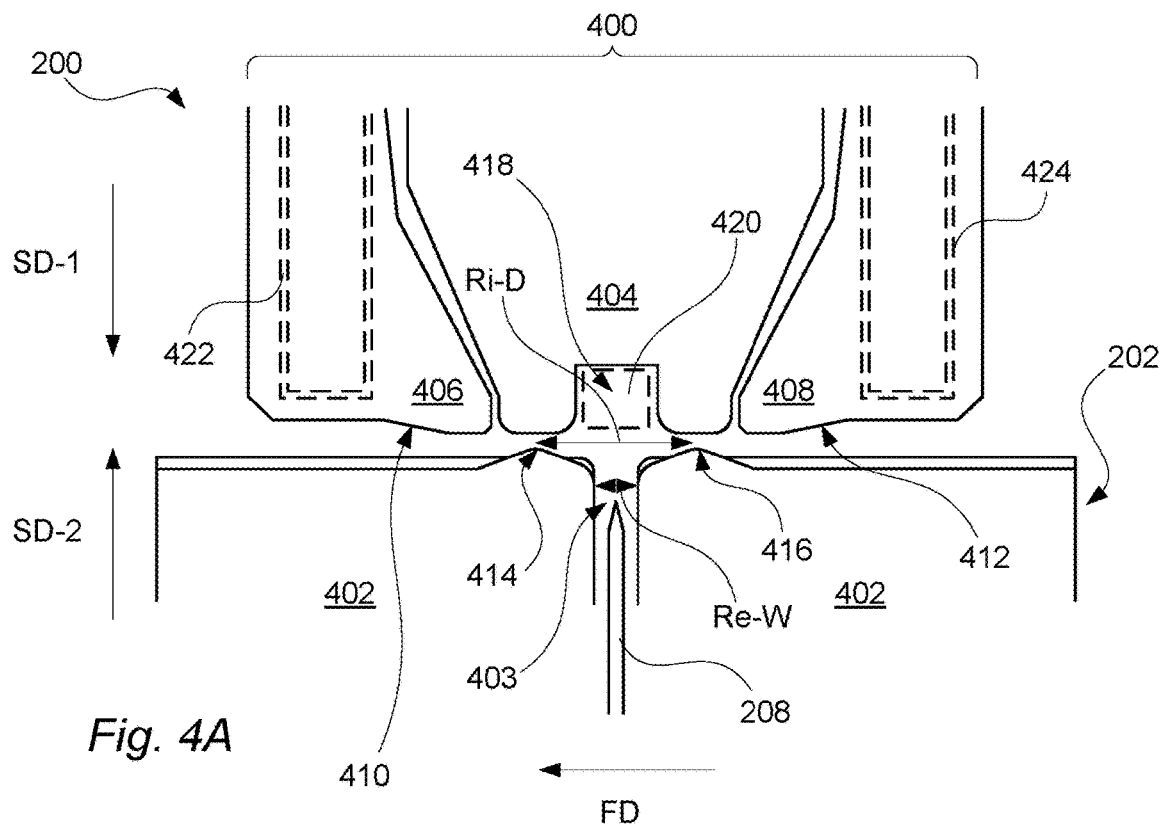
FIG. 4A illustrates a first example of an ultrasonic arrangement and an anvil.

FIG. 4A illustrates a first example of the transversal sealing system 110 illustrated in FIG. 2 in which the sealing device 200 constitutes an ultrasonic arrangement 400 and the counter pressure device 202 an anvil 402. In line with FIG. 2, the anvil 402 is provided with a recess 403 for housing the knife 208.

In this example, the ultrasonic arrangement 400 comprises a sonotrode 404 configured to produce ultrasonic waves, sometimes also referred to as ultrasonic vibrations, and a first pressure plate 406 placed downstream the sonotrode 404 with respect to the feeding direction FD, and a second pressure plate 408 upstream the sonotrode 404. Unlike the sonotrode 404, the first and second pressure plates 406, 408, are static, i.e. non-oscillating.

By having the first and second pressure plates 406, 408 provided next to the sonotrode 404, the ultrasonic vibrations can to a larger degree be directed onto the TS-LS overlap area 308 and the TS area 302 compared to an ultrasonic arrangement only comprising the sonotrode 404. An advantage of having a more well defined area in which the ultrasonic vibrations are provided is that a risk of having plastic lumps built up in the packaging material can be reduced. In addition, an effect of having better control on how the tube 104 is exposed to the ultrasonic vibrations is that it is possible to make more reliable predictions on how different anvil profiles, different sonotrode designs and/or profiles of the first and second pressure plates will affect the transversal sealing. This in turn implies that it is made possible to more accurately simulate or virtually model different profiles for a new packaging material, e.g. a packaging material in which a new polymer is being used or a packaging material in which a thinner carton layer is used.

In addition to focusing the ultrasonic vibrations onto the TS area 302 of the tube 104, the first and second pressure plates 406, 408 also provide pressure onto the tube 104. While the sonotrode 404 is providing a TS-LS pressure TS-LS P in the TS-LS overlap area 308, the first pressure plate 406 can provide a first pressure P1 onto the first area 304, placed upstream the TS-LS overlap area 308, and the second pressure plate 408 can provide a second pressure P2 onto the second area 306, placed downstream the TS-LS overlap area 308. Generally, the TS-LS pressure TS-LS P, is greater than the first pressure P1 and the second pressure P2. As an effect of the difference in pressures, there will be less heat generated in the TS-LS overlap area 308, that is, in the area where three layers of packaging material is provided, compared to the first and second area 304, 306 Further, the first and second pressure plates 406, 408 may be spring loaded. Alternatively, it is also possible to have the anvil 402 spring-loaded.

To provide for that displacement of the melted plastics can be controlled in more detail, the first pressure plate 406 may be provided with a first slope 410, sloping away from the sonotrode 404, and the second pressure plate 408 may be provided with a second slope 412 sloping away from the sonotrode 404.

Further, to provide for that the food product and/or the melted plastics in the packaging material, as well as providing a reliable sealing, a first and a second ridge 414, 416 can be provided on either side of the recess 403 holding the knife 208.

A width of the recess 403, herein referred to as recess width Re-W may be less than one third of a distance between the first and second ridge 414, 416, herein referred to as ridge distance Ri-D.

Opposite to the recess 403 of the anvil 402, a groove 418 of the sonotrode 404 may be provided. Optionally, in this groove 418 a third pressure plate 420 may be provided. As the first and second pressure plates 406, 408, the third pressure plate 420 may also be static, i.e. non-oscillating, and not active as the sonotrode 404. To provide for that the third pressure plate 420 can be static, this may be attached to, by way of example, the first and second pressure 406, 408 at end sections of the sonotrode (not illustrated).

As illustrated, there may be a gap between the sonotrode 404 and the first and second pressure plates 406, 408. To reduce a risk of having food residues or other unwanted particles stuck, the gap may be such that this can be flushed clean by using water.

Even though not illustrated, the first and/or second pressure plates 406, 408 may be equipped with ridges for blocking plastic lumps formed e.g. at edges of a TS-LS overlap area and/or at edges of an LS strip area to move away from the TS-LS overlap area and potentially beyond the first and/or second area 304, 306. By having the possibility to hinder plastic lumps from diverting, the risk of producing packages with insufficient quality can be reduced.

The ultrasonic waves generated by the sonotrode 404 as well as the TS-LS pressure TS-LS P formed by the sonotrode 404 generates heat. To compensate for the heat generated as an effect of the transversal sealing, a first water cooling tubing 422 may be provided in the first pressure plate 406 and a second water cooling tubing 424 may be provided in the second pressure plate 408. Using water is beneficial since this will not cause any food safety risk if for some reason, the first or second water cooling tubing 422, 424 starts to leak. However, even though water may be a choice used in many food packaging applications, other cooling media may also be applied for reducing the heat generated.

Figure 4B:
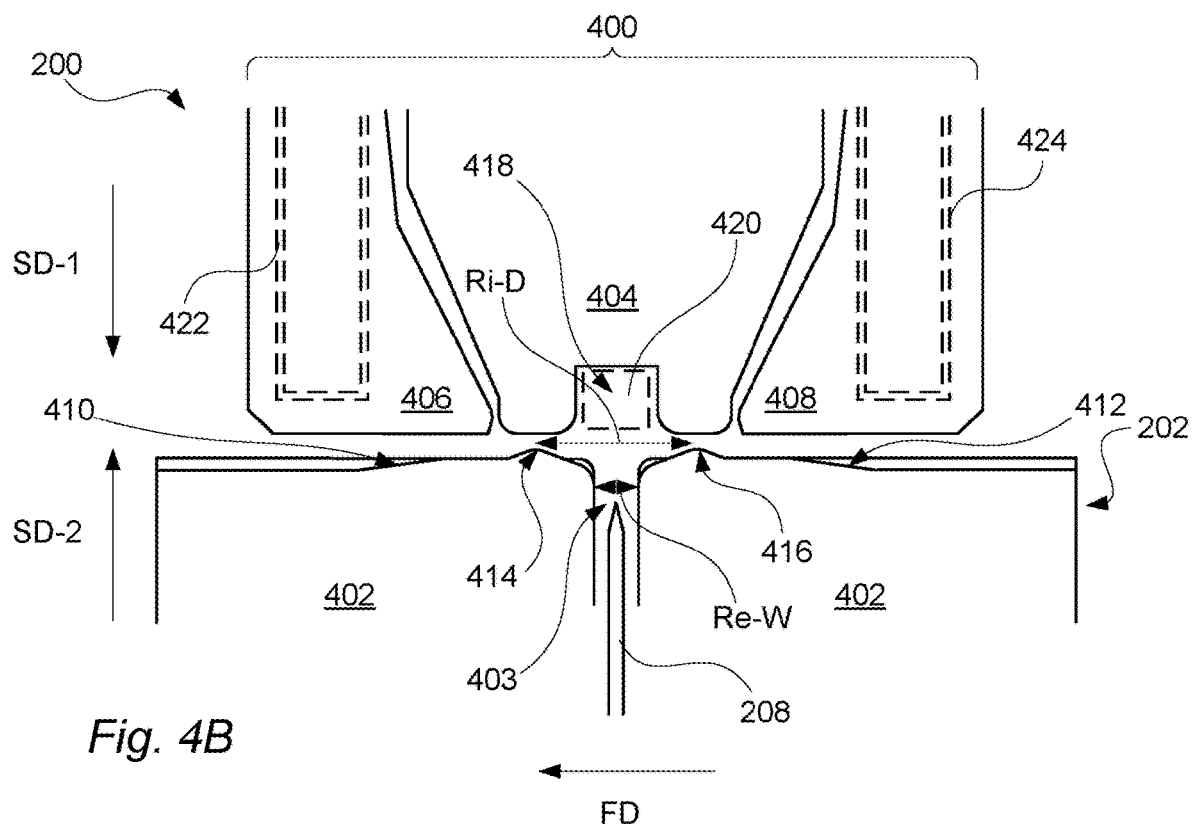
FIG. 4B illustrates a second example of the ultrasonic arrangement and the anvil.

FIG. 4B illustrates a second example of the transversal sealing system 110. In contrast to the first example illustrated in FIG. 4A, in the second example the first and second slopes 410, 412 are provided on the anvil 402 instead of the first and second pressure plates 406, 408. An advantage with having the slopes provided on the anvil, as illustrated in FIG. 4B, is that a more cost-efficient sealing device 200 can be achieved. It is namely possible to meet the specific properties of the packaging material by adjusting the slopes in accordance to the packaging material, e.g. by using virtual modelling. Having the same ultrasonic arrangement 400, that is, the sonotrode 404, and the first and second pressure plates 406, 408, while having packaging material specific anvils for different packaging material provides for that the sealing device 200 can be adapted to the packaging material in a cost efficient manner.

If using the packaging material discussed above comprising the cellulose-based layer, there will be differences compared to if using a packaging material solely comprising polymer layers. One reason for the differences is that the ultrasonic waves are propagating differently and also to a larger extent in the cellulose-based layer, such as the carton layer, compared to the polymer layer. For this reason, using the sealing device 200 illustrated in FIGS. 4A and 4B comes with particular benefits for the packaging material comprising the cellulose-based layer.

As illustrated in FIG. 4B, by having the first and second slopes 410, 412 provided on the anvil 402, the first and second pressure plates 406, 408 may be provided with surfaces on level with a surface of the sonotrode 404. This is advantageous in that the production costs can kept lower.

Figures 5A, 5B:
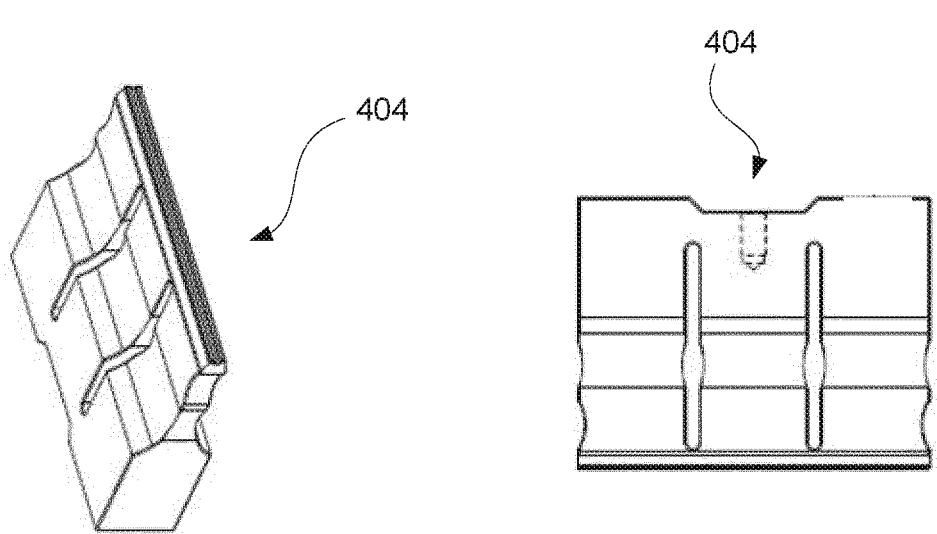
FIG. 5A illustrates a sonotrode from a perspective view.
FIG. 5B illustrates the sonotrode from a side view.

FIGS. 5A and 5B illustrate the sonotrode 404 in further detail. In FIG. 5A, the sonotrode 404 is illustrated from a perspective view, while FIG. 5B illustrates a side view of the sonotrode 404.

Figure 6:
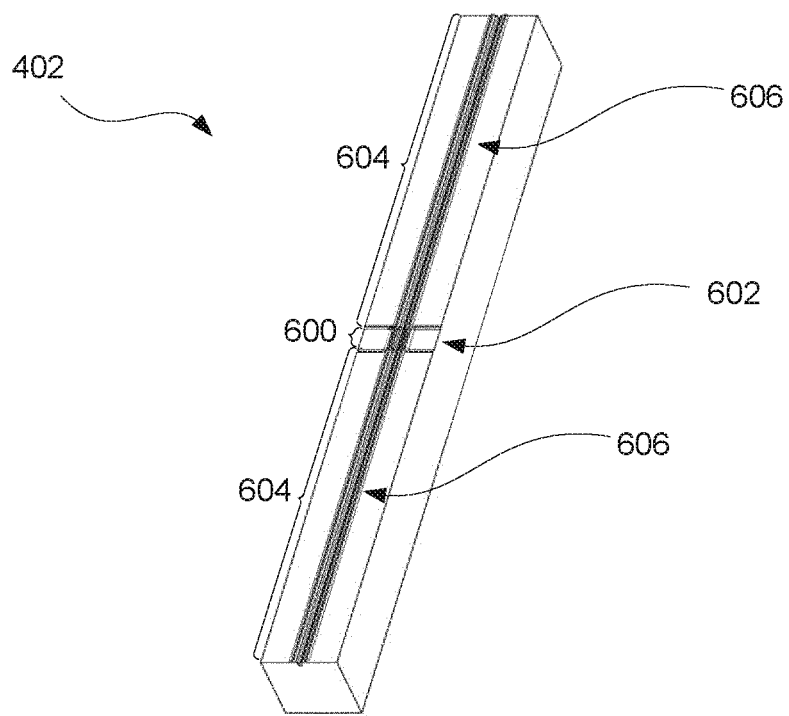
FIG. 6 illustrates the anvil from a perspective view.

FIG. 6 illustrates the anvil 402 in further detail. As illustrated, the anvil 402 may comprise a TS-LS anvil section 600 that may be provided with a TS-LS anvil profile 602 arranged to meet the TS-LS overlap area 308 of the tube 104, and a TS anvil profile 606 may be provided in a TS anvil section 604 arranged to meet a TS area 302 of the tube 104. A width of the TS-LS anvil section 600 may be greater than the TS-LS overlap area 308, thereby being less dependent on tube rotation, i.e. deviations in terms of how the LS is placed in the transversal sealing system 110 can be handled in an improved manner. By having the first and second pressure plates 406, 408, sufficient sealing can be provided both when two and three layers of packaging material is presented.

Figure 7:
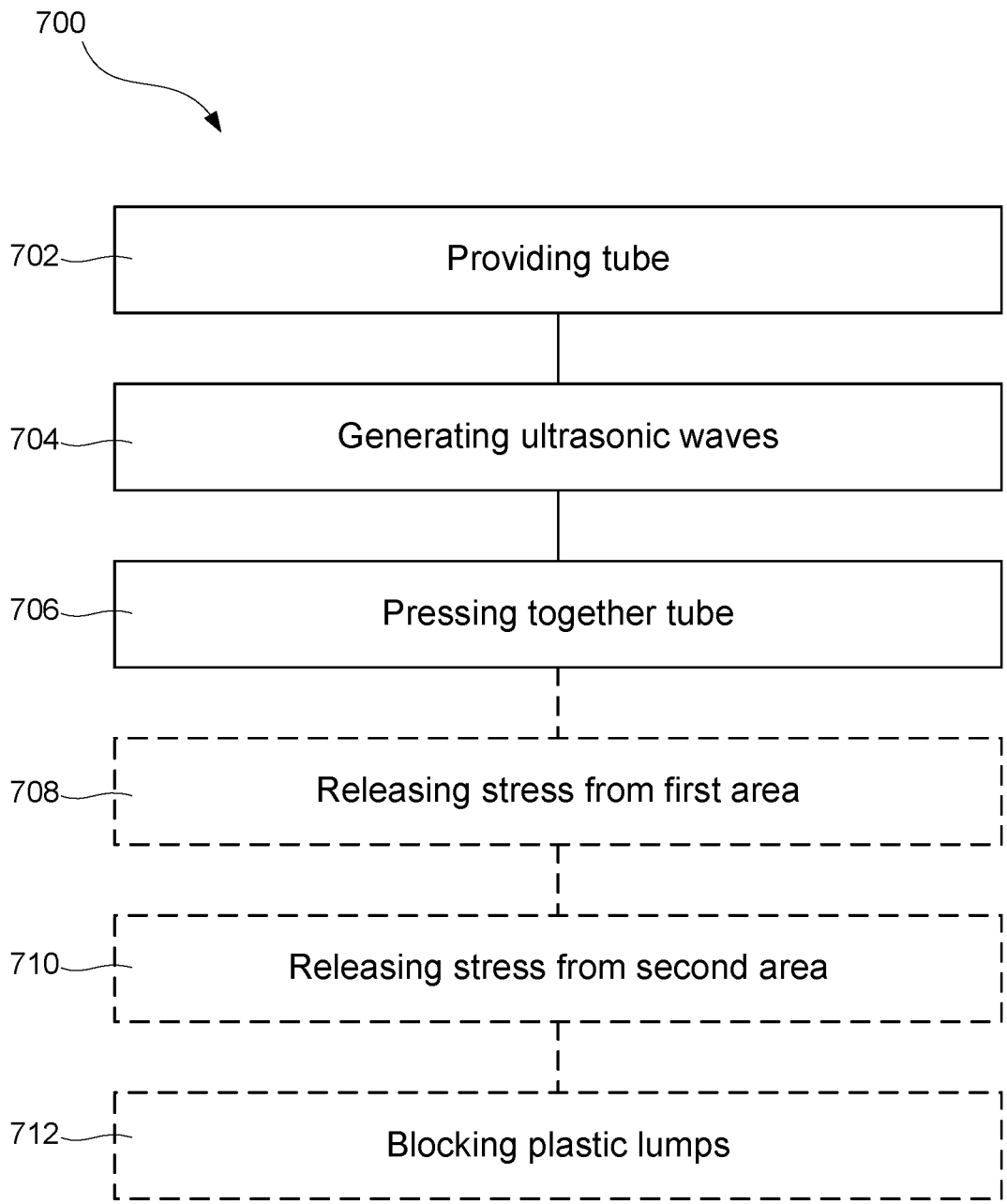
FIG. 7 is a flowchart illustrating a method for transversally sealing the tube of packaging material.

FIG. 7 is a flowchart illustrating a method 700 for transversally sealing the tube 104 of packaging material by way of example. In a first step 702, the tube 104 of packaging material can be provided in the feeding direction FD. In a second step 704, the ultrasonic waves can be generated by using the sonotrode 404 comprised in the ultrasonic arrangement 400 such that the inner layer of the packaging material in the transversal sealing area 302 at least partly melts. In a third step 706, the tube 104 is pressed together in the transversal sealing area 302 by moving the ultrasonic arrangement 400 in the first sealing direction SD-1 and moving the anvil 402 in the second sealing direction SD-2, wherein the second sealing direction SD-2 is opposite to the first sealing direction SD-1.

Optionally, in a fourth step 708, stress is released from the first area 304 by the first slope 410 sloping away from the sonotrode 404, and/or, in a fifth step 710, stress is released from the second area 306 by the second slope 412 sloping away from the sonotrode 404.

Optionally, in a sixth step 712, plastic lumps formed at edges of the TS-LS overlap area 308 and/or edges of the LS-strip area 312 can be blocked by at least one ridge provided on the first and/or second pressure plate 406, 408.

From the description above follows that, although various embodiments of the invention have been described and shown, the invention is not restricted thereto, but may also be embodied in other ways within the scope of the subject-matter defined in the following claims.

The invention claimed is:

1. A transversal sealing (TS) system for a packaging machine, said sealing system comprising
    an ultrasonic arrangement arranged to face an outside surface of a tube of packaging material from a first sealing direction, wherein the first sealing direction is perpendicular to a feeding direction of the tube, wherein the tube comprises a longitudinal sealing (LS) area in which at least two layers of packaging material are overlapping,
    an anvil arranged to face the outside surface from a second sealing direction, wherein the second sealing direction is opposite to the first sealing direction,
    wherein the ultrasonic arrangement comprises
    a sonotrode arranged to apply ultrasonic vibrations such that an inner layer of the packaging material is at least partly melted,
    a first pressure plate arranged next to the sonotrode and upstream the feeding direction of the tube, wherein the first pressure plate is non-oscillating,
    a second pressure plate arranged next to the sonotrode and downstream the feeding direction of the tube, wherein the second pressure plate is non-oscillating, and
    a third pressure plate placed in a groove in the sonotrode,
    wherein the sonotrode is arranged to provide a TS-LS overlap pressure in a TS-LS overlap area, the first pressure plate is arranged to provide a first pressure in a first area, placed upstream the TS-LS overlap area in the feeding direction, and the second pressure plate is arranged to provide a second pressure in a second area, placed downstream the TS-LS overlap area in the feeding direction.

2. The transversal sealing system according to claim 1, wherein the TS-LS overlap pressure is greater than the first pressure and the second pressure.

3. The transversal sealing system according to claim 1, wherein the first pressure plate is provided with a first slope sloping away from the sonotrode and/or wherein the second pressure plate is provided with a second slope sloping away from the sonotrode.

4. The transversal sealing system according to claim 1, wherein the anvil is provided with a first slope sloping away from the sonotrode and/or with a second slope sloping away from the sonotrode.

5. The transversal sealing system according to claim 1, wherein the first and second pressure plate extend along a full width of the sonotrode.

6. The transversal sealing system according to claim 1, wherein the anvil is provided with a TS-LS anvil profile in a TS-LS anvil section arranged to meet the TS-LS overlap area of the tube, and a TS anvil profile in a TS anvil section arranged to meet a TS area of the tube.

7. The transversal sealing system according to claim 1, wherein the sonotrode is provided with a TS-LS sonotrode profile in a TS-LS sonotrode section arranged to meet the TS-LS overlap area of the tube, and a TS sonotrode profile in a TS sonotrode section arranged to meet a TS area of the tube.

8. The transversal sealing system according to claim 1, wherein the first and/or second pressure plate are provided with at least one ridge for blocking plastic lumps formed at edges of the TS-LS area and/or edges of an LS-strip area.

9. The transversal sealing system according to claim 1, wherein the first and/or second pressure plate or the anvil are spring loaded.

10. The transversal sealing system according to claim 1, wherein the packaging material comprises at least one cellulose-based layer, an inner polymer layer, and is void of Aluminum.

11. A packaging machine comprising
a packaging material receiver,
a food product filling pipe arranged to fill food product into the tube, and
the transversal sealing system according to claim 1.

12. A method for transversally sealing a tube of packaging material, said method comprising
providing the tube of packaging material in a feeding direction,
generating ultrasonic waves by using a sonotrode comprised in an ultrasonic arrangement such that an inner layer of the packaging material in a transversal sealing (TS) area at least partly melts, and
pressing together the tube in the transversal sealing area by moving the ultrasonic arrangement in a first sealing direction and moving an anvil in a second longitudinal (LS) sealing direction, wherein the second sealing direction is opposite to the first sealing direction,
wherein the ultrasonic arrangement comprises
the sonotrode,
a first pressure plate arranged next to the sonotrode and upstream the feeding direction of the tube, wherein the first pressure plate is non-oscillating,
a second pressure plate arranged next to the sonotrode and downstream the feeding direction of the tube, wherein the second pressure plate is non-oscillating, and
a third pressure plate placed in a groove in the sonotrode,
wherein the sonotrode is arranged to provide a TS-LS overlap pressure in a TS-LS overlap area, the first pressure plate is arranged to provide a first pressure in a first area, placed upstream the TS-LS overlap area in the feeding direction, and the second pressure plate is arranged to provide a second pressure in a second area, placed downstream the TS-LS overlap area in the feeding direction.

13. The method according to claim 12, wherein the method further comprises
releasing stress from the first area by a first slope sloping away from the sonotrode, and/or
releasing stress from the second area by a second slope sloping away from the sonotrode.

14. The method according to claim 13, wherein the method further comprises
blocking plastic lumps formed at edges of the TS-LS overlap area and/or edges of an LS-strip area by at least one ridge provided on the first and/or second pressure plate.

* * * * *